(No Model.)
W. F. DRAPER.
LOOM.
No. 587,652. Patented Aug. 3, 1897.
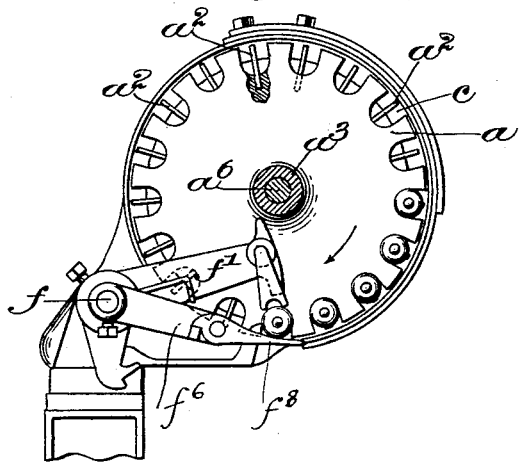
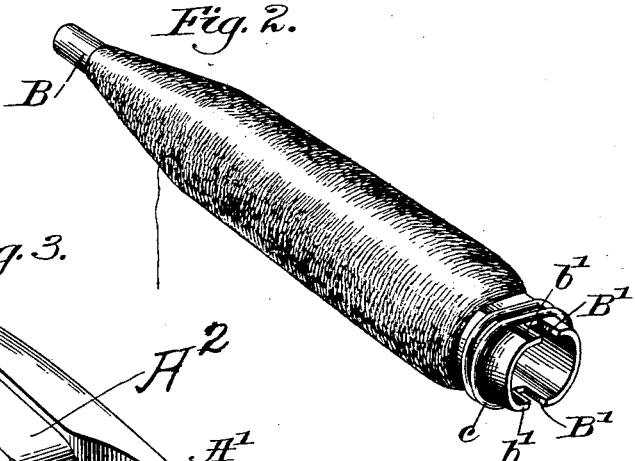
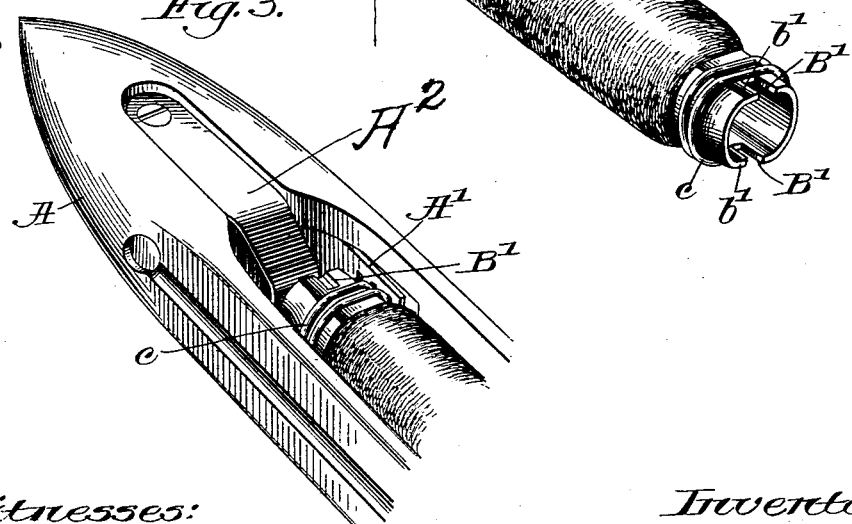
Witnesses:
A. C. Harwood
Thomas J. Drummond
Inventor.
William F. Draper.
by Crosby Gregory
attys.

UNITED STATES PATENT OFFICE.

WILLIAM F. DRAPER, OF HOPEDALE, MASSACHUSETTS, ASSIGNOR TO THE NORTHROP LOOM COMPANY, OF SAME PLACE AND SACO, MAINE.

LOOM.

SPECIFICATION forming part of Letters Patent No. 587,652, dated August 3, 1897.

Application filed January 4, 1897. Serial No. 617,869. (No model.)

*To all whom it may concern:*

Be it known that I, WILLIAM F. DRAPER, of Hopedale, county of Worcester, State of Massachusetts, have invented an Improvement in Looms, of which the following description, in connection with the accompanying drawings, is a specification, like letters on the drawings representing like parts.

In that class of looms known as "automatic" and built under the Northrop patents, of which United States Patent No. 529,940, dated November 27, 1894, is a type, wherein the filling-carriers are held in a revolving filling-carrier feeder, the said filling-carriers are, due to the jarring of the loom in rapid operation, liable to rotate in the feeder and wind or unwind the weft, which is apt to be injurious to the operation of the loom. It is also very advantageous to prevent the rotation of the filling-carrier as it is being put into the shuttle to eject therefrom the filling-carrier then in the shuttle. To obviate the turning of the filling-carrier in the feeder, I have provided the head of the carrier with a transverse slot and the feeder with a series of radial guides which receive the slotted heads of the carriers. I have also so shaped the heads of the carriers as to present two secant surfaces, which surfaces, when the carriers meet and are being pushed together, act one on the other to prevent any rotation of the carriers.

Figure 1 shows a sufficient portion of a filling-carrier feeder, together with a pusher, with my improvements added, to enable my invention to be understood. Fig. 2 shows the filling-carrier on a larger scale; Fig. 3, a part of a shuttle with part of a filling-carrier therein.

The filling-feeder, composed of the notched head or disk $a$ at one end of a sleeve $a^3$, mounted on a stud $a^6$, said notched head or disk running inside the stationary flanged ring or plate $c$, and the pusher $f'$, mounted on the stud $f$, are and may be all as in said patent, while the arm $f^6$, connected to the hub of the pusher and carrying the tip-supporting device $f^8$, are and may be all as usual in United States Patent No. 529,942, dated November 27, 1894.

The shuttle A, having jaws A', one of which is represented in Fig. 3, and the bridge $A^2$ are and may be all as common in United States Patent No. 538,507, dated April 30, 1895.

In accordance with my invention I have placed in the head or disk $a$ and in each one of its notches a guide $a^2$, said guides being so located therein that when the filling-carriers B are being put into the feeder the slots B' in the heads of the carriers will embrace each one of said guides, thus preventing any liability of the said carriers from being rotated while in said feeder or while being removed from said feeder by the action against it of the end of the pusher $f'$. I have also so shaped the head of the filling-carrier that it presents two flat or secant surfaces $b'$, and when a carrier is removed from the feeder one of these flat sides tends to and does contact with the flat upper side of a carrier then in the shuttle, so that the carrier being put into the shuttle cannot turn or rotate at all, due to the pressure of one carrier against another.

The metallic rings $c$ on the head of the carrier are common to Patent No. 538,507, above referred to.

It will be noticed that the flattened sides of the head of the filling-carrier, as the latter is removed by the pusher from the feeder into position between the jaws of the shuttle, strike the flattened face of the abutment $A^3$, connected with the shuttle and having its free end located between the jaws A', said flattened surface by its contact with said abutment materially aiding in preventing the accidental slipping or sidewise motion of the filling-carrier.

Having described my invention, what I claim as new, and desire to secure by Letters Patent, is—

1. In an automatic loom, a filling-carrier feeder provided with radial guides to engage the filling-carriers to prevent their rotation in the feeder and to aid in directing them in their removal from said feeder, substantially as described.

2. A filling-feeder having notches to receive the head of a filling-carrier and provided with a series of guides placed in said notches to restrain the rotation of the said carriers in said notches, combined with a pusher to act on said filling-carriers and push them from said feeder radially, substantially as described.

3. A filling-carrier having its head provided with flattened opposite sides, the flattened sides being slotted, and metallic rings surrounding said head beyond the inner ends of said slots, said rings being flattened so as to present parallel portions at opposite sides of the head, said flattened or parallel portions lying upon the flattened portions of the head, substantially as described.

In testimony whereof I have signed my name to this specification in the presence of two subscribing witnesses.

WILLIAM F. DRAPER.

Witnesses:
 GEO. OTIS DRAPER,
 A. W. BEARDSELL.